(12) United States Patent
Pellegrino (10) Patent No.: US 10,432,767 B2
(45) Date of Patent: Oct. 1, 2019

(54) CASE FOR MOBILE TELEPHONE

(71) Applicant: Luigi Pellegrino, Cerritos, CA (US)

(72) Inventor: Luigi Pellegrino, Cerritos, CA (US)

( * ) Notice: Subject to any disclaimer, the term of this patent is extended or adjusted under 35 U.S.C. 154(b) by 0 days.

(21) Appl. No.: 15/927,061

(22) Filed: Mar. 20, 2018

(65) Prior Publication Data

US 2018/0270339 A1    Sep. 20, 2018

Related U.S. Application Data

(60) Provisional application No. 62/473,589, filed on Mar. 20, 2017.

(51) Int. Cl.
| | |
|---|---|
| *H04R 9/06* | (2006.01) |
| *H04M 1/03* | (2006.01) |
| *H04M 1/02* | (2006.01) |
| *H04M 1/18* | (2006.01) |

(52) U.S. Cl.
CPC ........... *H04M 1/035* (2013.01); *H04M 1/026* (2013.01); *H04M 1/185* (2013.01)

(58) Field of Classification Search
CPC .............................. H04M 1/035; H04M 1/026
See application file for complete search history.

(56) References Cited

U.S. PATENT DOCUMENTS

| | | | |
|---|---|---|---|
| 2009/0184145 A1* | 7/2009 | Yeh .......................... | B60R 11/02 224/400 |
| 2013/0301863 A1* | 11/2013 | Weaver, III .......... | H04R 1/2853 381/334 |

\* cited by examiner

*Primary Examiner* — Tuan H Nguyen (57) ABSTRACT

A case for a mobile device includes embodiments having a support, a base, a plurality of outer walls, a plenum, and a sound guide. The base has a surface parallel to the mounting plane, and the outer walls extend from the base toward the mounting plane. The outer walls and the base (together with one or more surfaces of the mobile device) define a plenum, which is configured to receive sound from a mobile device when the mobile device is mounted to the case. The sound guide diverts sound toward two or more of the outer walls or through a combination of one or more outer wall, the base, and a front surface of the case.

18 Claims, 5 Drawing Sheets

CASE FOR MOBILE TELEPHONE

RELATED PATENT APPLICATION

This application claims the benefit of U.S. provisional patent application No. 62/473,589, filed on Mar. 20, 2017. The entire content of the provisional patent application is incorporated herein in its entirety for all purposes.

BACKGROUND OF THE INVENTION

Field of the Invention

This invention is in the field of cases for mobile devices, such as telephones.

Many portable electronic devices deliver sound, such as speech or music to the user. While details vary, the devices generally include a limited region that delivers sound to the user. This limited region generally delivers sound in a manner the designers believed adequate for most purposes. However, in many circumstances, sound delivery from one limited region is not adequate. For example, some users may operate a phone or other device with the device held away from the body or placed on a surface. The sound emitted may thus not be directed at the user. There is thus a need for a case that delivers the sound produced by a mobile device to a different direction than the device provides.

In other circumstances, a user may wish to deliver audio in multiple directions, such as when the device delivers music or other audio to multiple people or to a room. There is thus a need to deliver the sound produced by a mobile device to a plurality of directions.

While remote speakers are available, they are not always convenient to carry and may not be at hand when needed. Sound redirection would be better if it were produced by a part always transported with the device.

Commercial cases exist that redirect sound from one side of a mobile device to another. However, these cases are not capable of redirecting sound in multiple directions at the same time. Such cases also may not divide the available sound among multiple directions in a way that produces a desired distribution of sound.

There is thus a need for a case for a portable device that can address these and other shortcomings.

SUMMARY

In embodiments, the invention includes a case for a mobile device. The mobile device may include a planar rear surface and a sound port. The case may include a support, a mounting plane, a base, a plurality of outer walls, a plenum, and a sound guide. In embodiments, the support is set up to retain the rear surface of a mobile device at the mounting plane. The base has a surface parallel to the mounting plane, and the outer walls extend from the base toward the mounting plane. The outer walls and the base (together with one or more surfaces of the mobile device) define a plenum, which is configured to receive sound from a mobile device when the mobile device is mounted to the case. The sound guide diverts sound toward two or more of the outer walls or through a combination of one or more outer wall, the base, and a front surface of the case.

In some embodiments, the case may further include a plurality of ports on the two or more of the outer walls.

The support may be configurable in an open state and a closed state, with the support in the closed state forming a recess complementary to the mobile device. In such embodiments, the support may have a first segment, a second segment, and a latch. The first segment may be movable with respect to the second segment, and the latch may be configured to lock the first segment to the second segment when the support is closed.

The case may further include a director adjacent the sound port of the mobile device to direct sound from the sound port to the plenum when the mobile device is mounted in the case. In embodiments, the director may include a reflecting wall adjacent the plenum. The first reflecting wall may be disposed at an acute angle with respect the base.

When the sound port is disposed on the rear surface of the mobile device, the reflecting wall may be disposed at an obtuse angle with respect to the base.

The sound guide may include a dividing wall extending from the base into the plenum. The dividing wall may have a cylinder section and a straight section. The cylinder section may be closer to (proximal) the director with the straight section further away (distal) from the director. The straight section may terminate at one of the outer walls. The sound guide may also include a second (or other additional) dividing wall(s) extending from the base.

In embodiments, the plurality of ports may be disposed on three or more of the outer walls and the base. The ports may include an aperture through the respective outer wall or base. In some embodiments, the aperture extends through the base and the base adjacent the aperture has a local deflector to direct sound to the aperture.

The ports may include a recess in the respective outer wall or base rather than an aperture. The depth of the recess may be more than one-half the thickness of the respective outer wall or base so that the balance of the wall or base transmits sound through the thinned section of wall or base.

In other embodiments, the invention includes a case for redirecting sound from a mobile phone. The case includes a planar base and a set of outer walls extending upward from the base. Above the base, the case includes a mount that is complementary to at least a portion of a mobile phone; the mount couples to the plurality of outer walls. A plenum may be adjacent the base, and may be divided by multiple dividing walls. One or more of the dividing walls may include a cylinder section and a straight section that adjoins and is coupled to the cylinder section. The straight section may also be coupled to one of the outer walls.

In still other embodiments, the invention includes case for redirecting sound from a mobile phone. The case includes a planar base surrounded by four outer walls. A dividing wall extends from the base and terminates at one of the outer walls. A first port may be disposed on one of the outer walls with a second port disposed on another of the outer walls. When a mobile phone is mounted to the case, the case directs sound from the mobile phone to the two ports.

The first port may include an aperture or a blind recess in the outer wall.

DETAILED DESCRIPTION OF THE INVENTION

In embodiments, the invention includes a case for holding a portable electronic device such as a cellular phone. Cases for such devices are well known and generally conform to the shape of the device to hold and protect the device. The case redirects sound from the phone in one or more directions.

Figure 1:
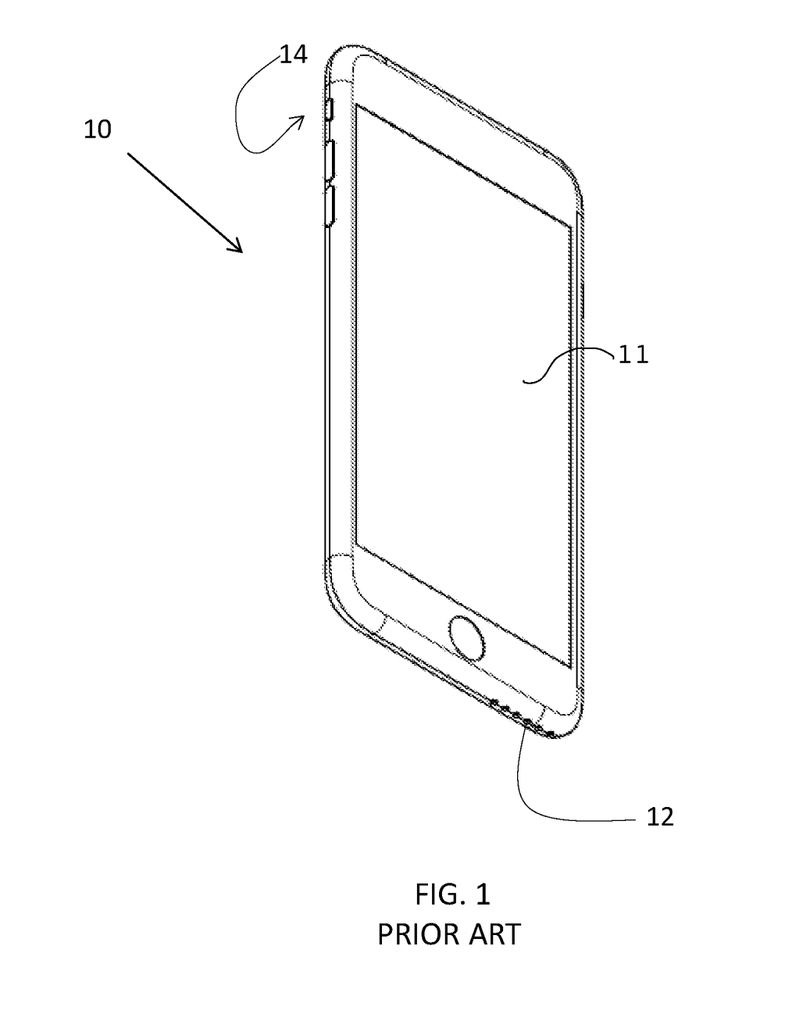
FIG. 1 shows a cellular telephone.

FIG. 1 shows a portable electronic device with some details not relevant to the invention omitted for simplicity; the illustration shows an iPhone 6s plus sold by Apple Inc. of Cupertino, Calif. Embodiments of the invention are described below in relation to this phone, but analogous versions of the described embodiments are applicable to other phones or to other portable electronic devices. Adjustments to the described embodiments to fit to the size, shape, and position of components of other portable electronic devices will be clear to the skilled practitioner.

Phone 10 includes a generally flat front surface and a substantially planar rear surface 14 parallel to the front surface. Device 10 produces sounds, which exit device 10 through sound port 12. Sound port 12 may be in one of several positions on device 10; the illustrated device includes sound port 12 as a set of small openings on one edged of device 10.

The descriptions below refer to embodiments of the case and of phone 10 in the normally used orientation when phone 10 is mounted in the case. In this orientation, the front 11 of phone 10 is the larger flat side including the large display and circular home button (not labeled). The rear 14 of phone 10 faces away from front 11. Frontward is towards front 11 (from the rear) in the direction perpendicular to front 11. Rearward is the opposite of frontward. Curved side walls connect the front to rear surface 14. In the illustrated phone 10, bottom and top side walls are shorter than left and right side walls. The bottom is towards the side wall including sound port 12. The top is the opposite end from the bottom. Left and right are defined with the front of phone 10 facing the observer. These directions apply also to parts of the invention external to the phone. For example, a surface is rearward of rear surface 14 if it is further away from the front of phone 10 than from rear surface 14.

Figure 2:
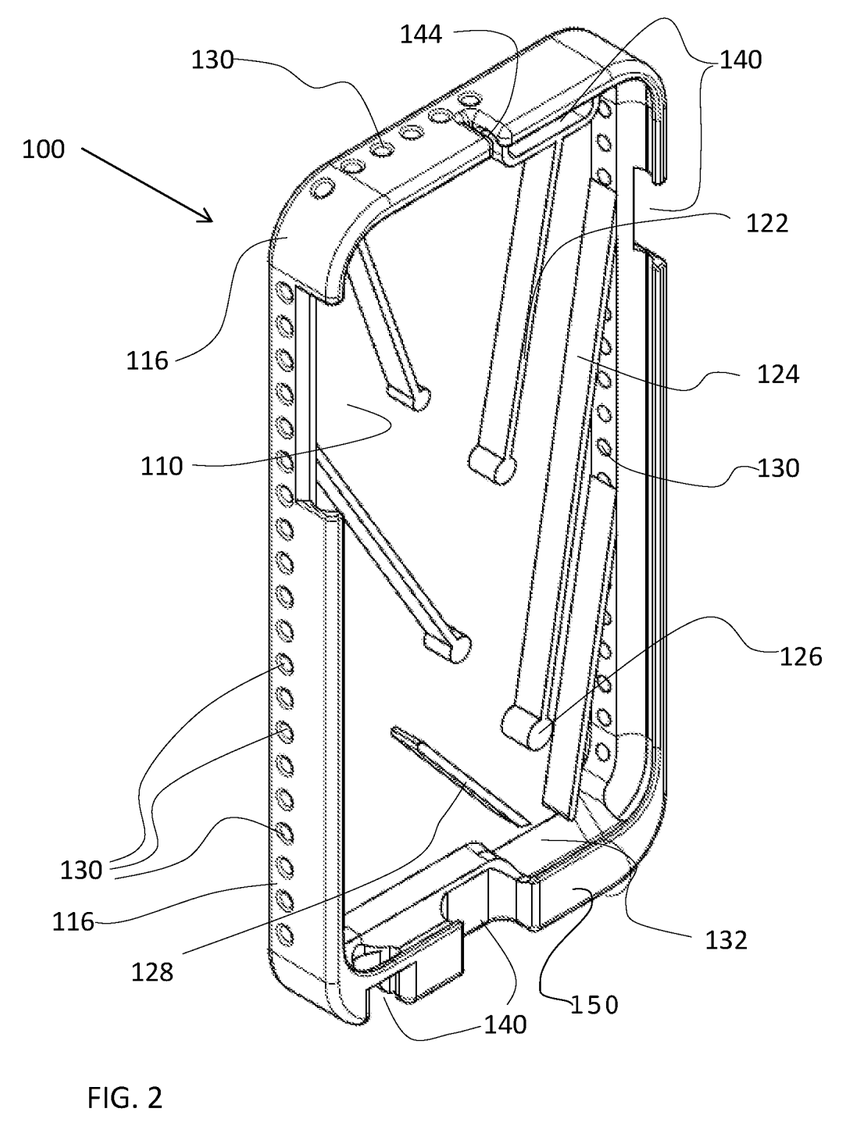
FIG. 2 shows an perspective view an embodiment of the invention
Figure 3:
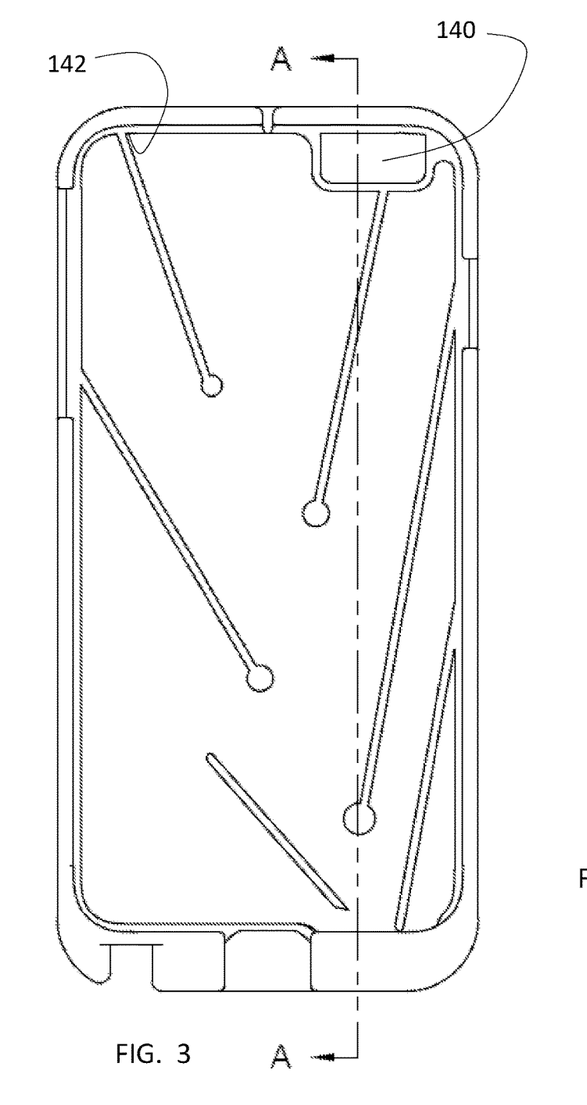
FIG. 3 a plan view of the embodiment of FIG. 2.
Figure 4:
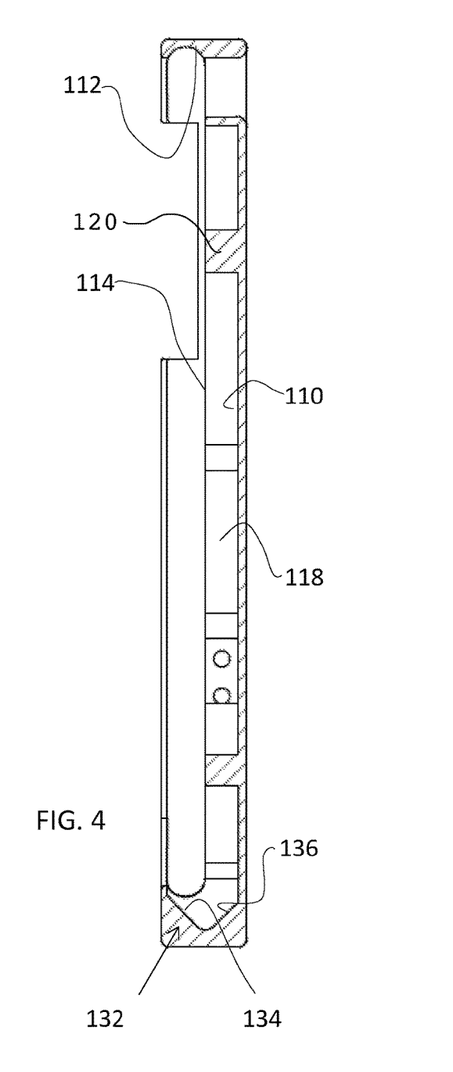
FIG. 4 shows a cross sectional view of the embodiment of FIG. 2 along line AA of FIG. 3.

Referring to FIGS. 2-4, the invention includes embodiments of a case 100. Case 100 has a substantially planar base 110, outer walls 116, and a support 112. Case 100 may be molded or otherwise formed of one or more polymers such as polycarbonate or polyetherimide or similar high strength materials. In some embodiments, case 100 may also include compliant materials such as elastomers to provide protection or flexibility. Case 100 may also include decorative materials such as printed, embossed, or molded images, decals, colorants, tints, fabric, leather, or similar materials. In other embodiments, case 100 may be formed of tooled leather or similar materials.

Base 110 is substantially planar. Substantially means that at least a large fraction of the base is planar or nearly planar. Base 110 may include nonplanar regions to accommodate features of the phone 10 or to add, for example, features to enhance a user's grip or to hold the phone at a desired viewing angle or to hold personal items such as credit cards. Base 110 may be about 0.03 to about 0.12 inches thick, depending on the material selected. Base 110 protects the rear of phone 10 and connects the other parts together. When phone 10 is mounted within case 100, base 110 cooperates with rear surface 14 to form a plenum described in more detail below.

Outer walls 116 (a subset of which are labeled in FIG. 2) surround base 110 and rise about perpendicularly from base 110. Outer walls 116 and base form an open box into which phone 10 fits. Outer walls 116 may include features such as access openings 140, sound ports 130, and flex openings 144.

In some embodiments, case 100 includes face portions 150 parallel to base 110 and having a surface extending from the extremity of outer walls 116. These face portions 150 may roughly align with the front surface of mobile device 10 when mobile device 10 is seated into case 100. Exemplary front portions 150 are illustrated near the bottom of case 100 but may extend from any of outer walls 116 of case 100.

Outer walls 116 form support 112 towards the front of case 100 to hold phone 10 above and parallel to base 110. Support 112 includes holding features complementary in shape to portions of phone 10. For example, support 112 in this embodiment includes a curved profile most easily viewed in FIG. 4. The curved profile matches the complementarily curved edges of phone 10. Support 112 may contact phone 10 at less than the full contour of phone 10. For example, support 112 may conform to phone 10 only at the corners, along portions of two or more edges, or in any combination of surfaces and edges that define a fixed relationship between phone 10 and case 100.

The purpose of support 112, aside from the obvious need to hold the phone to the case, is to hold the phone in a fixed relationship to the front facing surface of base 110. Support 112 holds rear surface 14 at a fixed height defined by seating plane 114. The space between seating plane 114 (and rear surface 14 when phone 10 is inserted) and front facing surface of base 110 defines a plenum 118 that conducts sound produced by phone 10. Other features of case 100 (such as the sound guide 120 described in more detail below) may also serve to support phone 10 at seating plane 114.

The height (front to back distance) of plenum 118 is determined empirically to transmit sound produced by phone 10. Desirably, the height is small to avoid making the case too large to be comfortably carried or held. In embodiments, plenum 118 is between about 0.05 inches and about 0.5 inches high. We have found that a height of about 0.2 inches adequately transmits sound while keeping the outside dimensions of case 100 reasonable to hold and carry.

Plenum 118 is contiguous with sound director 132 and is divided by sound guide 120. When phone 10 is mounted in case 100, sound port 12 of phone 10 is disposed adjacent sound director 132 of case 100. The purpose of sound director 132 is to reflect or scatter sound emitted from sound port 12 so that the reflected or scattered sound enters plenum 118. Sound director 132 may comprise reflecting wall 134 placed immediately adjacent sound port 12. Reflecting wall 134 forms part of outer walls 116 and is disposed between about 0.05 and 0.5 inches away from sound port 12. In some embodiments reflecting wall 134 may be disposed substantially perpendicular to base 110 so that an expanding cone of sound from sound port 12 is at least partially redirected to plenum 118.

In other embodiments (such as that of FIG. 4), sound director 132 includes at least one additional reflecting wall 136. In such embodiments, additional reflecting wall 136 may be oriented about perpendicularly to reflecting wall 134 with reflecting wall 134 (disposed closer to the front of case 100) at about a 45 degree angle to the front of case 100. Additional reflecting wall 136 (disposed closer to the rear of case 100) may be oriented at about a 45 degree angle to the rear of case 100. The paired reflecting walls act as a retroreflector to deliver sound from sound port 12 to plenum 118.

In still other embodiments, reflecting wall 134 may be curved, such as a reflector having an elliptical cross section. Sound port 12 may be disposed near one focus of the ellipse with the second focus communicating with plenum 118. This may advantageously directs more of the sound from sound port 12 to plenum 118.

Sound guide 120 is disposed in plenum 118 and functions to direct sound emitted by phone 10 from sound port 12 of phone 10 to ports 130 of case 100. Sound guide 120 comprises one or more dividing walls 122. Dividing walls 122 may rise from base 110 across the height of plenum 118 to seating plane 114. Dividing walls 122 may thus help to support back surface 14 of phone 10 at the height of seating plane 114. In other embodiments, some portions of dividing walls 122 do not extend as far as seating plane 114 to allow some sound to pass over dividing walls 122 for "tuning" or adjustment of the distribution of sound among ports 130.

Dividing walls 122 may include straight sections 124 and scattering sections 126. Scattering sections 126 may have convexly curved walls such as the cylindrical walls illustrated at multiple locations in FIGS. 2, 3, and 5. A straight section 124 may couple to and terminate at a scattering section 126 where scattering section 126 forms a cylindrical boss or post extending into plenum 118 from base 110. The cylindrical walls of scattering sections 126 may be of diameter comparable to the width of straight sections 124 or they may have diameters several times the width of straight sections 124, such as that illustrated at reference number 126. Alternatively, scattering sections 126 may have concavely curved walls or angled walls such as that illustrated at the bottom end of second dividing wall 128.

The purpose of dividing walls 122 is to guide sound to particular sections of outer walls 116. To this end, dividing walls generally extend away from sound director 132 and divide plenum 118 into two or more sections. Dividing walls 122 and scattering sections 126 distribute sound emitted by phone 10 at sound port 12 and redirected by sound director 132. The fraction of the sound distributed within a section by dividing walls 122 is roughly related to the angle subtended by the opening between the dividing walls 122 (and the inner aspect of outer walls 116 where they bound a section) with respect to sound director 132. Scattering sections 126 modulate the amount of sound directed to a section by reflecting or scattering a portion of the sound. The amount of this modulation depends on the size and curvature of each scattering section 126. The distribution of dividing walls 122 and scattering sections 126 may be determined by modeling sound propagation in the plenum or may be determined empirically. Large subtended angles between dividing walls 122 apportion more sound to the sections that deliver sound to larger numbers of ports 130.

A plurality of ports 130 may penetrate outer walls 116 or base 110 of face portions 150 to deliver sound. The size Ports 130 may be symmetrical or elongated. In some embodiments, ports 30 are circular about 0.05 inches to about 0.125 inches in diameter. In other embodiments, sound ports 130 may not fully penetrate outer walls 116 or base 110 but may include thinned or more flexible areas of outer walls 116 or base 10. These thinned or more flexible areas more readily transmit sound outside of case 100 from plenum 118. This alternative sound port design keeps plenum 118 more tightly sealed against dirt and other contamination.

Sound ports 130 may include variable sound transmission so that some of sound ports 130 transmit more sound than others. This may be accomplished by varying the size of sound ports 130. In embodiments where sound ports 130 include thinned or more flexible areas, the transmissivity of sound ports 130 may also be controlled by different degrees of flexibility or thickness. The variable sound transmission of sound ports 130 advantageously provides another method by which sound may be released from different portions of case 100. Further, the sound transmission of selected ones of sound ports 130 may be adjusted to more evenly balance or otherwise adjust the sound from different portions of case 100.

In some embodiments, one or more of ports 130 are disposed in sound director 132 to allow emission of sound through the bottom end of case 100 or through adjacent face portions 150. Since sound intensity is high near sound port 12, ports 130 in sound director 132 may be designed to emit only a small fraction of the sound. This may be accomplished by placing few sound ports 130 in this area or by making ports small.

Figure 8:
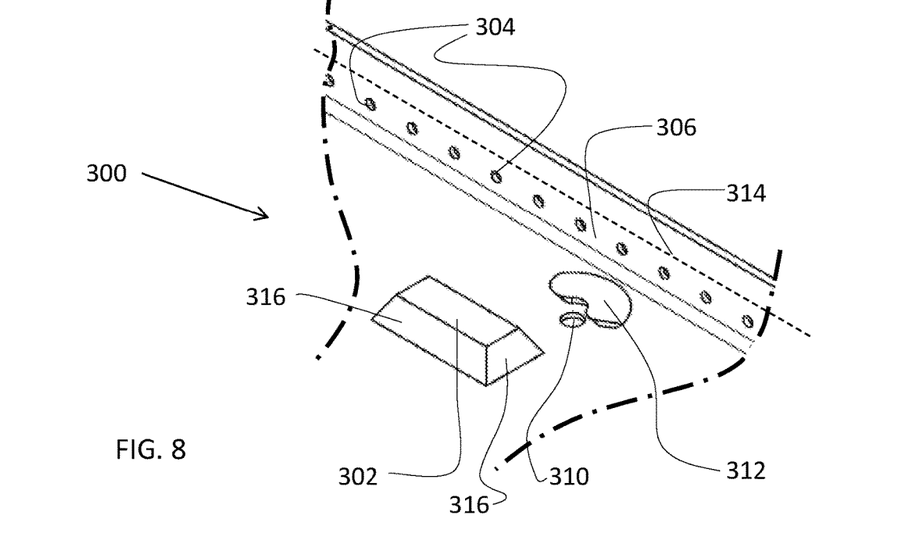
FIG. 8 shows a partial perspective view of a third embodiment of the invention.

In other embodiments, such case 300 illustrated in FIG. 8, ports may be placed in multiple surfaces bounding the plenum. Side ports 304 (similar to ports 130 of the FIG. 2 embodiment) are disposed in the back portion of outer walls 306 (below seating plane 314). Base ports 310 may be disposed in the base of case 300. Base ports 310 may resemble ports as described for other embodiments and may include additional features such as deflector 302 or focuser 312. Focuser 312 projects above surrounding areas of the base and partially surrounds the location of base port 310. Focuser 312 serves to reflect sound propagating through the plenum toward base port 310. The body of focuser 312 may be disposed on the side of base port 310 distal to the source of the sound. Deflector 302 projects above surrounding areas of the base and serves to further modulate the sound that reaches base port 310 or side ports 304. Deflectors 302 can be placed to "fine tune" the intensity of sound reaching particular ports.

Deflector 316 may also serve to as a sound director when phone 10 emits sound from its rear surface. In such embodiments, deflector 302 may include a flat upper surface parallel to the base and angle sides 316 to direct sound from the phone into the plenum. Angled sides 316 may intersect the base at an angle greater than ninety degrees (an obtuse angle) to direct sound about the plenum.

In some embodiments, one or access openings 140 may penetrate outer walls 116 to provide user access to phone features such as buttons, charger/communication ports and other accessory ports. Access openings 140 may also function as flex openings as described in more detail below.

In some embodiments, one or flex openings 144 may penetrate outer walls 116 to provide additional flexibility to case 100. Flex openings 114 may extend from the front of case 100 through the part of outer walls 116 that forms support 112. Depending on materials used, case 100 may be relatively rigid, which can make inserting and removing phone 10 more difficult. Flex openings 144 increase the flexibility of case 100 in the area of support 112 to make it easier for a user to insert or remove phone 10.

Figures 5, 6:
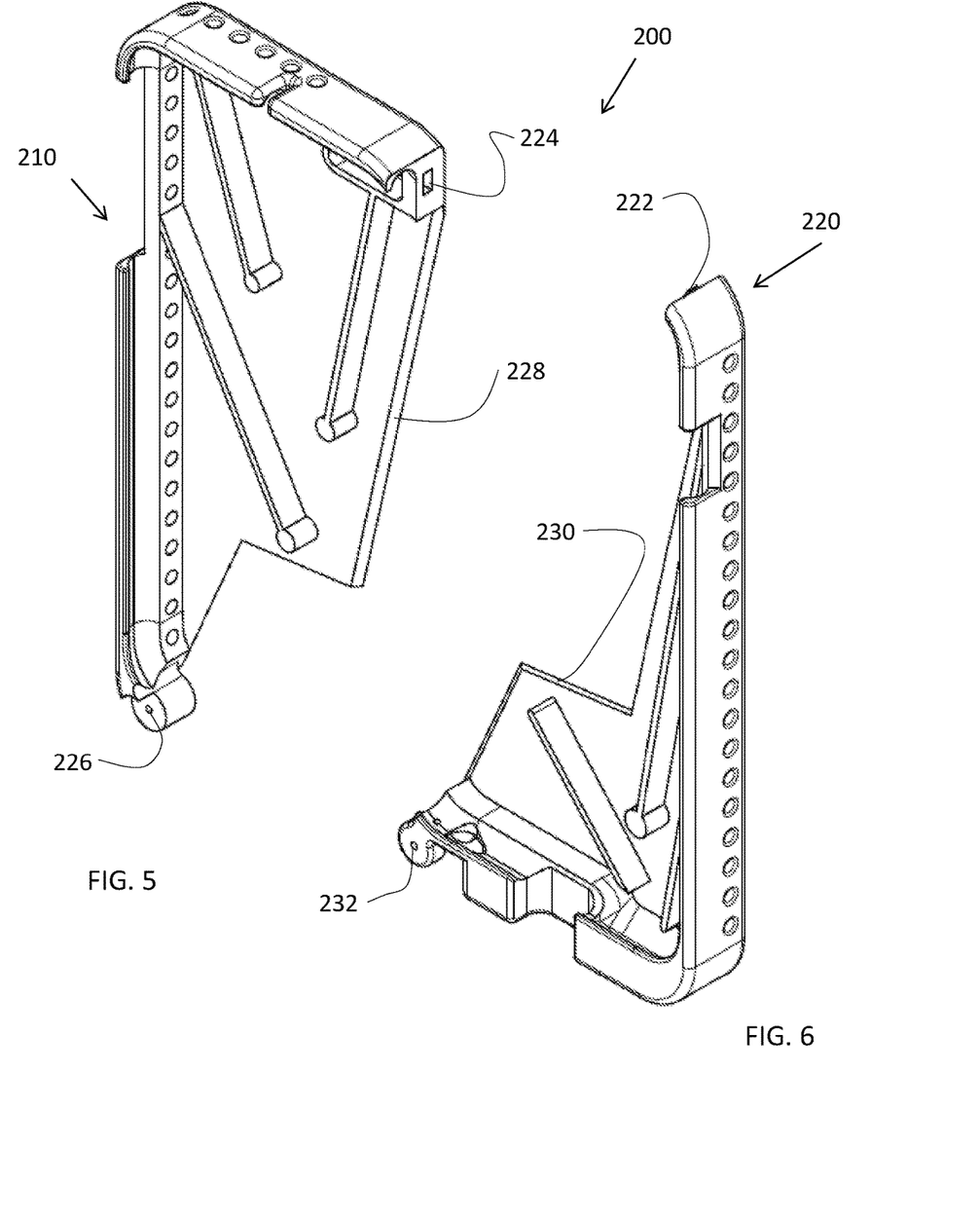
FIG. 5 and FIG. 6 show perspective views of left and right portions of a second embodiment of the invention.
Figure 7:
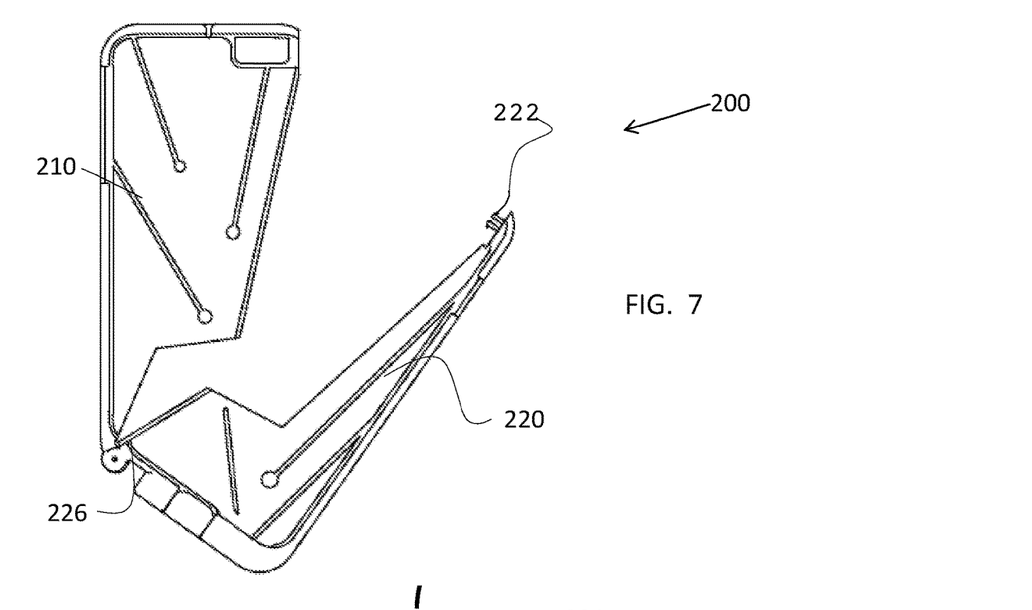
FIG. 7 shows a perspective view of the assembled second embodiment in the open configuration.

The design of case 100 may be difficult to mold or to mount to phone 10 because of its undercuts and its rigidity. In some embodiments, these difficulties may be addressed by providing hinging case 200 in two or more parts that connect together. For example, FIGS. 5-7 illustrate an embodiment of a hinging case 200. Hinging case 200 is substantially similar to the embodiment described above. It differs in that hinging case 200 is divided into a first section 210 and a second section 220. First section 210 and second section 220 have complementary mating surfaces 228 and 230. A pin connects first section 210 and second section 220 at respective pivot 226 and pivot mate 232 near one corner. First section 210 and second section 220 pivot about the pin so that hinging case 200 may be open as illustrated in FIG. 7. Phone 10 may be positioned in the support section of hinging case 200. Hinging case 200 may then be closed about phone 10 and be held in the closed position by latch 222 and latch receiver 224. Latch 222 includes one or more flexible tines that engage with an aligned opening of latch receiver 224 when hinging case 200 is closed about phone 10. Phone 10 may be released by flexing the tines of latch 222.

The examples and embodiments described herein are for illustrative purposes only; various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

This specification discloses various aspects of the invention with reference to particular embodiments, but it should be understood that any of the features, functions, materials, or characteristics may be combined with any other of the described features, functions, materials, or characteristics. The description of particular features, functions, materials, or characteristics in connection with a particular embodiment is exemplary only; it should be understood that it is within the knowledge of one skilled in the art to include such feature, structure, or characteristic in connection with other embodiments whether or not explicitly described. I intend the scope of the appended claims to encompass such alternative embodiments. Variations on these described embodiments will become apparent to those of ordinary skill in the art upon reading the description. The inventor expects skilled artisans to employ such variations as appropriate, and the inventors intend for the invention to be practiced otherwise than specifically described herein. Accordingly, this specification and claims include all modifications and equivalents of the subject matter recited in the claims appended hereto as permitted by applicable law.

Unless otherwise indicated, all numbers used in the specification and claims are to be understood as being modified in all instances by the term "about." Unless indicated to the contrary, the numerical values in the specification and attached claims are approximations that may vary depending upon the desired properties sought to be obtained. The disclosure of each document (including each patent application or patent) described in this document is incorporated by reference herein. In the event of a conflict between this document and the content of documents incorporated by reference, this document shall control.

The terms "a," "an," "the" and similar referents used in the context of describing the invention (especially in the context of the following claims) are intended to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the claims. No language in the specification should be construed as indicating any non-claimed element essential to the practice of the invention.

I claim:

1. A case for a mobile device comprising: a support configured to retain a rear surface of a mobile device at a mounting plane; a base laving a surface parallel to the mounting plane; a plurality of outer walls extending from the base toward the mounting plane, the outer walls and the base defining a plenum, the plenum configured to receive sound from a mobile device when the mobile device is mounted in the case; and a sound guide configured to divert sound toward two or more of the plurality of outer walls, wherein the sound guide includes a first dividing wall having a straight section and a cylinder section, the cylinder section comprising a cylindrical post extending from the base and connected to the straight section; the case further comprising a director disposed to receive sound from a mobile device when the mobile device is mounted in the case and configured to direct sound to the plenum.

2. The case of claim 1, further comprising a plurality of ports disposed on two or more of the plurality of outer walls and communicating with the plenum.

3. The case of claim 2, further comprising a base port disposed on the base and communicating with the plenum.

4. The case of claim 3, wherein the base port includes a local deflector to focus sound to the base port.

5. The case of claim 2, further comprising a face extending from one or more of the plurality of outer walls, the face including a face port communicating with the plenum.

6. The case of claim 2, wherein the plurality of ports includes an aperture through the respective outer wall.

7. The case of claim 2, wherein the plurality of ports includes a recess extending at least half-way into the respective outer wall.

8. The case of claim 1, wherein the support is configurable in an open state and a closed state, the support in the closed state forming a recess complementary to the mobile device.

9. The case of claim 8, wherein the support includes a first segment, a second segment, and a latch, the first segment movable with respect to the second segment and the latch configured to lock the first segment to the second segment when the support is in the closed state.

10. The case of claim 1, wherein the director includes a first reflecting wall disposed adjacent the plenum.

11. The case of claim 10, wherein the first reflecting wall is disposed at an acute angle with respect the base.

12. The case of claim 11, wherein the first reflecting wall is disposed at an obtuse angle with respect to the base.

13. The case of claim 1, wherein, the cylinder section is proximal to the director and the straight section is distal to the director.

14. The case of claim 13, wherein the straight section terminates at one of the plurality of outer walls.

15. The case of claim 1, wherein the sound guide further includes a second dividing wall extending from the base.

16. A case for redirecting sound from a mobile phone, the case comprising: a planar base and a plurality of outer walls extending from the base; a mount complementary to a portion of a mobile phone, the mount coupled to the plurality of outer wall; and a plenum adjacent the base, the plenum divided by a plurality of dividing walls, wherein one of the plurality of dividing walls includes a cylinder section and a straight section coupled to the cylinder section, the straight section coupled to one of the plurality of outer walls, the cylinder section comprising a cylindrical post extending from the base and connected to the straight section.

17. A case for redirecting sound from a mobile phone, the case comprising:

a first section and a second section, the first section pivotably mounted to the second section, the case configurable in an open state and a closed state, the case in the closed state including a planar base surrounded by four outer walls;

a dividing wall extending from the base and terminating at one of the outer walls;

a first port disposed on a first of the four outer walls; and a second port disposed on a second of the four outer walls, wherein, when a mobile phone is mounted to the case, the case directs sound from the mobile phone to the first port and the second port, and wherein the case is configured to close about a mobile phone when the case is in the closed state and to release a mobile phone when the case in the open state.

18. The case of claim 17, wherein the first port includes one of an aperture in the first of the four outer walls or a recess in the first of the four outer walls.

\* \* \* \* \*